United States Patent
Drzymala et al.

(10) Patent No.: US 10,521,629 B2
(45) Date of Patent: Dec. 31, 2019

(54) HANDHELD SYMBOL READER WITH OPTICAL ELEMENT TO REDIRECT CENTRAL ILLUMINATION AXIS

(71) Applicant: Zebra Technologies Corporation, Lincolnshire, IL (US)

(72) Inventors: Mark Drzymala, Saint James, NY (US); Edward Barkan, Miller Place, NY (US); Igor Vinogradov, Oakdale, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/952,740

(22) Filed: Apr. 13, 2018

(65) Prior Publication Data
US 2019/0318140 A1    Oct. 17, 2019

(51) Int. Cl.
*G06K 19/00* (2006.01)
*G06K 7/10* (2006.01)

(52) U.S. Cl.
CPC ..... *G06K 7/10732* (2013.01); *G06K 7/10881* (2013.01); *G06K 2007/10524* (2013.01)

(58) Field of Classification Search
USPC ................ 235/435, 439, 454, 462
See application file for complete search history.

(56) References Cited

U.S. PATENT DOCUMENTS

| | | | |
|---|---|---|---|
| 5,418,356 A | 5/1995 | Takano | |
| 5,686,720 A | 11/1997 | Tullis | |
| 8,450,708 B2 | 5/2013 | Liu et al. | |
| 2008/0128499 A1* | 6/2008 | Chen | G06K 7/10851 235/444 |
| 2011/0075234 A1 | 3/2011 | Ullman | |
| 2013/0334315 A1 | 12/2013 | Vinogradov et al. | |
| 2014/0048684 A1 | 2/2014 | Barkan et al. | |
| 2015/0115034 A1* | 4/2015 | Lei | G06K 7/10732 235/462.06 |
| 2015/0261988 A1 | 9/2015 | Lei et al. | |
| 2017/0199348 A1 | 7/2017 | Yin et al. | |

OTHER PUBLICATIONS

International Search Report and Written Opinion for International Application No. PCT/US2019/027054 dated Jul. 3, 2019.
International Search Report and Written Opinion for International Application No. PCT/US2019/027048 dated Aug. 22, 2019.

* cited by examiner

*Primary Examiner* — Matthew Mikels
(74) *Attorney, Agent, or Firm* — Yuri Astvatsaturov

(57) ABSTRACT

An apparatus and assembly for redirecting the central illumination axis of an illumination assembly towards the central field of view (FOV) axis of an imaging assembly using an optical element that provides an optical magnification of less than 1.5×, where the central illumination axis at the point of the illumination assembly is non-parallel to the central FOV axis.

10 Claims, 8 Drawing Sheets

HANDHELD SYMBOL READER WITH OPTICAL ELEMENT TO REDIRECT CENTRAL ILLUMINATION AXIS

BACKGROUND OF THE INVENTION

In some barcode readers, the central illumination axis of light emitted by the illumination source is nonparallel with the central field-of-view (FOV) axis of the imaging assembly. As a result, the imaging assembly may not obtain a suitable image of the barcode or other symbol, as the barcode is not properly or uniformly illuminated, or barcode is entirely or partially outside the FOV of the imaging assembly. Past barcode readers have addressed this problem by placing a lens in front of the illumination source to redirect the central illumination axis. However, the lens magnified the light emitted by the illumination source. This had the effect of magnifying the brightest spots of the illumination source (i.e., hotspots) on the barcode, which, in turn, caused oversaturation of all or part of the barcode thereby degrading the quality of the captured image of the barcode.

Accordingly, there is a need for a barcode reader with an optical element to redirect the central illumination axis towards the central FOV axis of the imaging sensor with little to no magnification.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
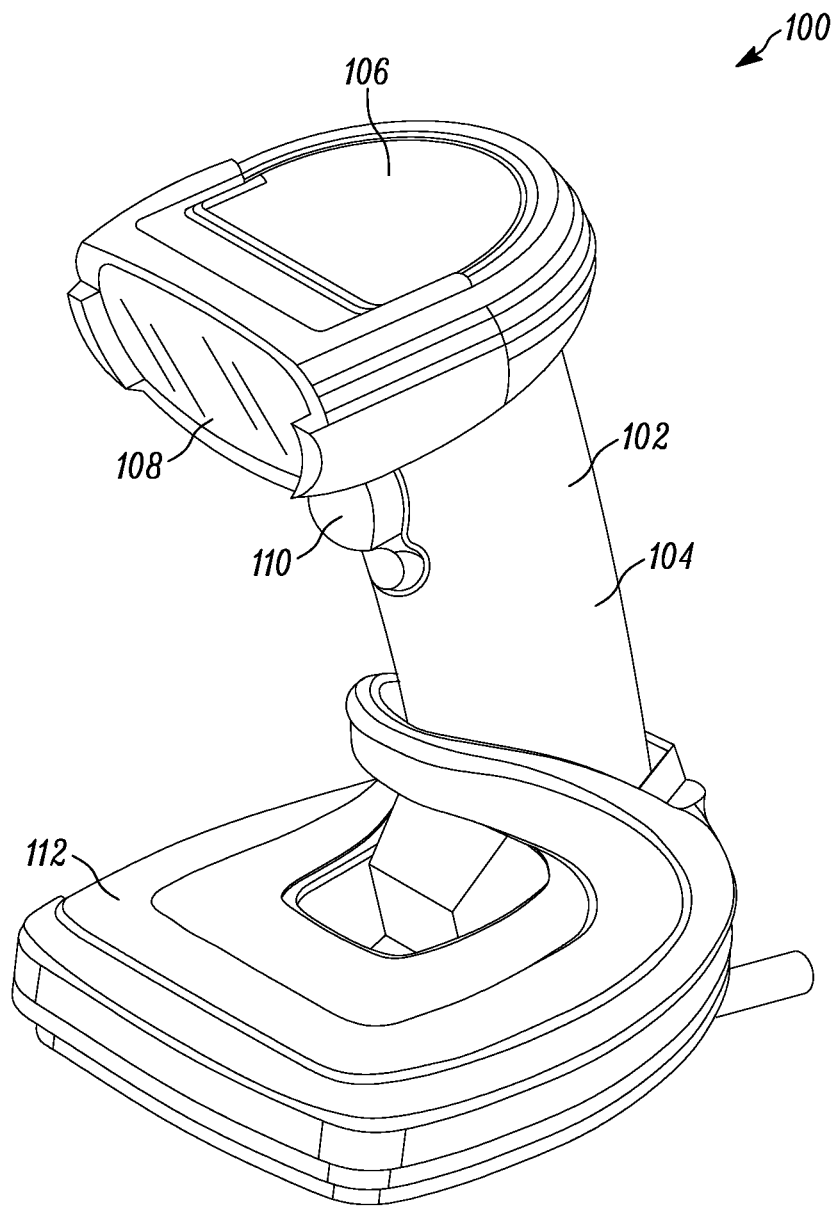
FIG. 1 illustrates a perspective view of a barcode reader according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an apparatus that includes a housing, an imaging assembly, an illumination assembly and an optical element. The imaging assembly is positioned within the housing and includes an image sensor having a plurality of photosensitive elements forming a substantially flat two-dimensional surface. The image sensor has a field of view (FOV), and the FOV having a central FOV axis. The image sensor is configured to capture either light reflected from a target and light emitted from the target. The illumination assembly is positioned within the housing and configured to emit light having a central illumination axis. The central illumination axis at the point of the illumination assembly is non-parallel to the central FOV axis. The optical element is positioned within the housing and adapted to redirect the central illumination axis towards the central FOV axis at a surface. The optical element provides an optical magnification of less than 1.5×.

Another aspect of the present disclosure provides an assembly that includes a housing, an imaging assembly, an illumination assembly and a prism. The housing has a scanning head and a handle. The scanning head has a proximal end, a distal end, and a central head axis extending from the proximal end to the distal end. The imaging assembly is positioned within the scanning head, and has a field of view (FOV) directed towards the proximal end. The FOV has a central FOV axis parallel in relation to the central head axis. The imaging assembly is configured to capture at either light reflected from a target and light emitted from a target. The illumination assembly is positioned within the scanning head in front of the imaging assembly and faces the proximal end at an acute angle with respect to the central head axis. The illumination assembly is configured to emit light having a central illumination axis. The central illumination axis at the point of the illumination assembly is non-parallel to the central FOV axis. The prism is positioned within the scanning head in front of the illumination assembly, and configured to redirect the central illumination axis such that the central illumination axis converges towards the central FOV axis as both axes extend away from the proximal end.

Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is also a base 112 attached to the handle portion 104 opposite the head portion 106. The base 112 is configured to stand on a surface and support the housing 102 in a generally upright position. The barcode reader 100 can be used in a hands-free mode as a stationary workstation when it is placed on the countertop. The barcode reader 100 can also be used in a handheld mode when it is picked up off the countertop and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode. In some implementations, the base 112 can be omitted, and the housing 102 can also be in other handheld shapes. Other implementations may provide only handheld or only handsfree configurations.

Figure 2:
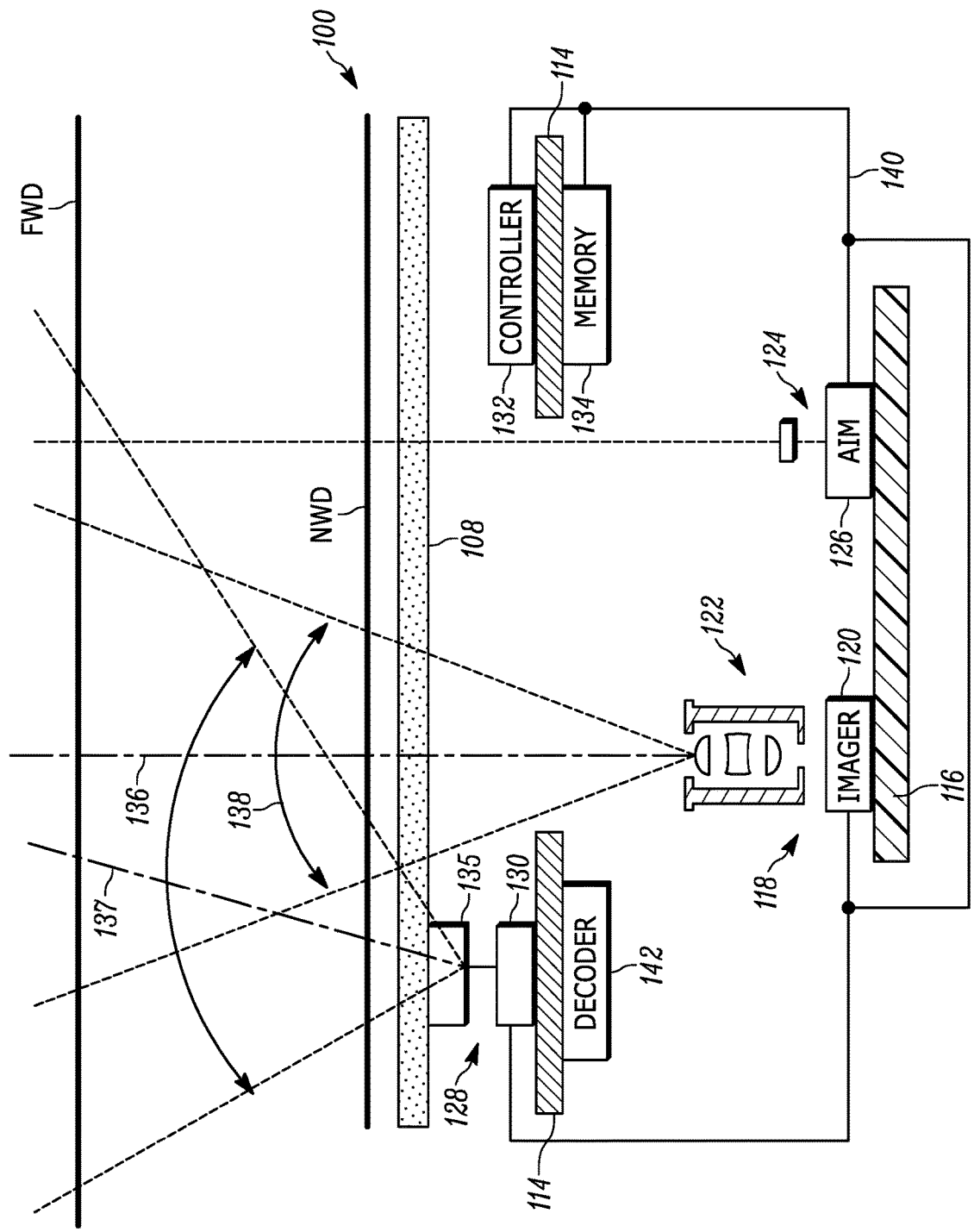
FIG. 2 illustrates a block schematic diagram some of the components of the barcode reader of FIG. 1.

FIG. 2 illustrates a block schematic diagram of a portion of a barcode reader 100 in accordance with some embodiments. It should be understood that FIG. 2 is not drawn to scale. The barcode reader 100 in FIG. 2 includes: (1) a first circuit board 114; (2) a second circuit board 116; (3) an imaging assembly 118 that includes an imaging sensor 120, and an imaging lens assembly 122; (4) an aiming assembly 124 that includes an aiming light source 126; (5) an illumination assembly 128 that includes an illumination light source 130; (6) a controller 132; and (7) a memory 134.

The imaging sensor 120 can be either CCD or CMOS imaging sensors that generally include multiple photosensitive pixel elements aligned in one-dimensional array for linear sensors or two-dimensional array for two-dimensional sensors. The imaging sensor 120 is operative to detect light captured by the imaging lens assembly 118 along an optical path or central field of view (FOV) axis 136 through the window 108. Generally, the image sensor 120 and imaging lens assembly 122 pair is designed to operate together for capturing light scattered, reflected, or emitted from a barcode as pixel data over a one-dimensional or two-dimensional FOV 138 that extends between a near working distance (NWD) and a far working distance (FWD). NWD and FWD denote the distances between which the imaging assembly 118 is designed to read barcodes. In some embodiments, the NDW is between approximately 0 and approximately 2 centimeters from the nose 158 and the FWD is between approximately 25 and approximately 150 inches from the nose 158.

The imaging sensor 120 is operated by the controller 132, such as a microprocessor, that is communicatively connected thereto. Additionally, the controller 132 is communicatively connected to the aim light source 126, illumination light source 130, and memory 134. Although the link between these components is illustrated as a single communication bus 140, this is merely illustrative, and any communication link between any of the devices may either be dedicated or may include more than the two selected devices. Additionally, placement of components on either side of any of the circuit boards is similarly exemplary. In operation, the memory 134 can be accessible by the controller 126 for storing and retrieving data. In some embodiments, the first circuit board 114 also includes a decoder 142 for decoding one or more barcodes that are captured by the imaging sensor 120. The decoder 142 can be implemented within the controller 132 or as a separate module 142.

As indicated above, the illumination light source 130 is communicatively connected to the controller 132, and is activated by the controller 132 in response to a user actuating the trigger 110 in a handheld mode. In a handsfree mode, the controller 132 may continuously activate the illumination light source 130. The illumination light source 130 is operative to emit light through the window 108 along an optical path or central illumination axis 137 through the window 108. In an embodiment, the illumination light source 130 is vertically offset from the imaging sensor 120. In another embodiment, in order to avoid directing an intense amount of light at the middle of a barcode and over-saturating the barcode, the barcode reader has two illumination light sources, each horizontally offset to either side of the imaging sensor 120.

Figure 3:
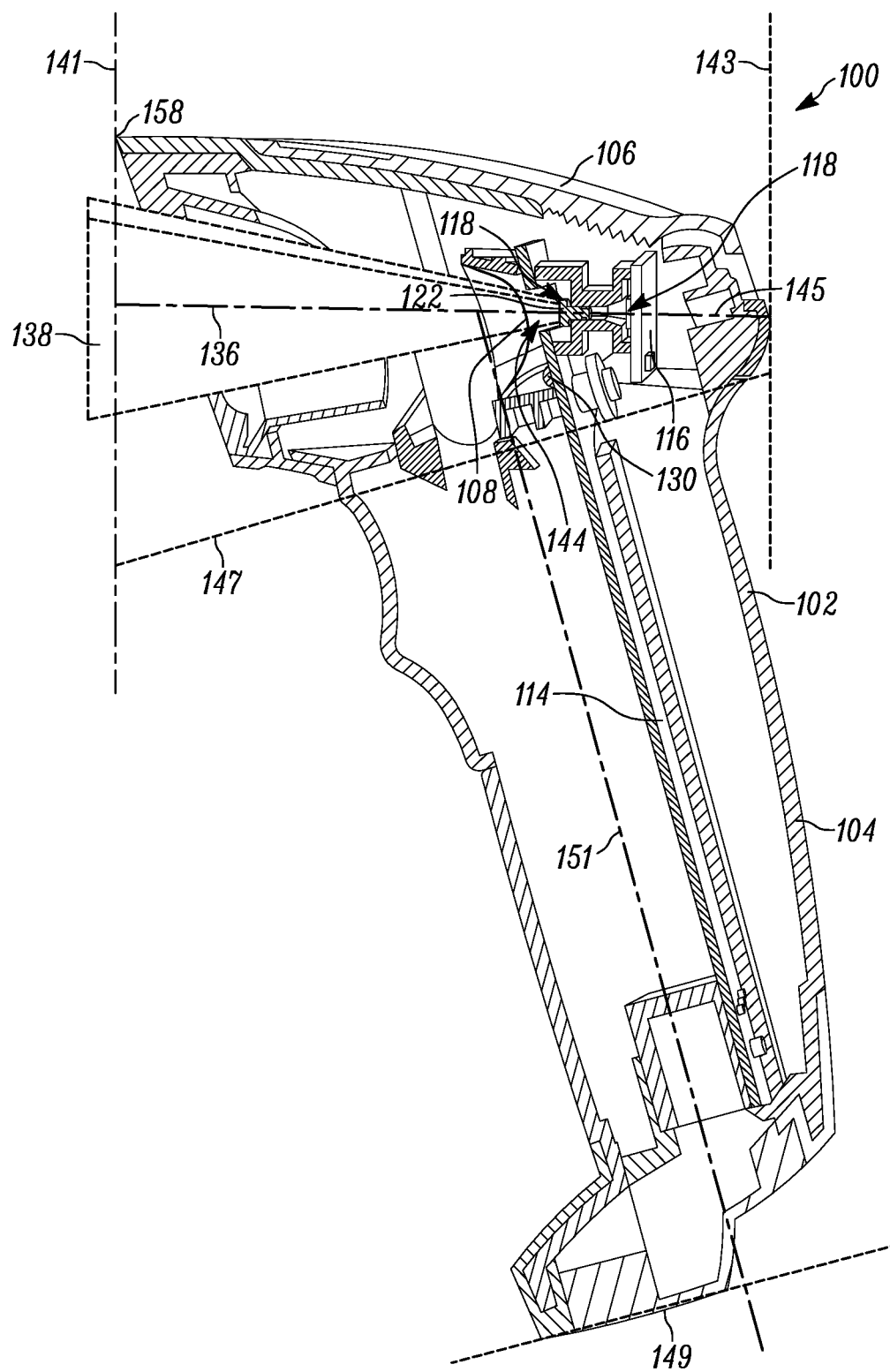
FIG. 3 illustrates a side perspective cut-away view of a barcode reader in accordance with an embodiment of the present invention.

As also indicated above, the illumination light source 130 is provided on the first circuit board 114, whereas the imaging sensor 120 is provided on the second circuit board 116. As shown in the embodiment of FIG. 3, the first circuit board 114 extends into the handle 104 at the same angle as the handle 104. The second circuit board 116, however, is positioned within the scanning head 106 such that the first circuit board 114 is positioned at an oblique angle relative to the second circuit board 116. In a preferred embodiment, the angle between the first circuit board 114 and the second circuit board 116 is between 10 and 20 degrees, and preferably about 15 degrees, which corresponds to a preferred ergonomic design for a reader user to hold and aim the reader 100. Seen another way, the scanning head 106 has a proximal end 141, a distal end 143 and a central head axis 145. The first circuit board 114 generally faces the proximal end 141 of the scanning head 106 (as defined by a vector normal to the first circuit board plane) at the same oblique angle with the central head axis 145 as between the first circuit board 114 and the second board 116. In turn, the central illumination axis 137 at the point of the illumination light source 130 is directed at generally the same oblique, non-parallel angle relative to the central FOV axis 136 of the imaging assembly 118. As such, an optical element 135 is provided in front of the illumination light source 130 to redirect the central illumination axis 137 towards the central FOV axis 136.

The optical element 135 may be any optical element that redirects light emitted by the illumination light source 130, and, more particularly, redirects the central illumination axis 137 of the illumination light source 130 with little to no magnification of the light. In some embodiments, the optical element 135 is a prism, such as a deflecting prism, though the optical element 135 may also be a mirror, a series of mirrors, optical waveguide(s), etc. Where the optical element 135 is an optical waveguide, it will be understood that an optical waveguide restricts the spatial range in which the light can propagate using a region having an increased refractive index as compared to the surrounding medium. Examples of suitable optical waveguides include, but are not limited to, single mode optical fiber, channel waveguides, planar waveguides, and strip waveguides. Preferably, the optical element does not magnify, or only minimally magnifies, the illumination light from the illumination light source 130 in order to avoid specular reflections off the barcode. In an embodiment, the optical element 135 provides an optical magnification of less than 1.5×, where the magnification of the optical element 135 is measured as: $M=f/(f-d_0)$, where f is the focal length of the optical element 135, and $d_0$ is the distance between the optical element 135 and the illumination light source 130.

The optical element 135 is preferably made of a low dispersion material having an Abbe number of at least 40, so as to maintain the wavelength of the light emitted by the illumination light source 130 (e.g., 620-660 nanometers). The Abbe number is a measure of the material's wavelength dispersion (with high values indicating low dispersion). Examples of low dispersion materials include, but are not limited to, poly(methyl methacrylate) (PMMA), crown material (e.g., crown glass, crown plastic), cyclo olefin polymer, acrylic, and polycarbonate).

In an embodiment, the optical element 135 is adhered, or otherwise affixed, to the window 108. In a different embodiment, the window 108 may be molded such that the optical element 135 is integral with the window 108. In yet another embodiment in which the barcode reader 100 has two illumination sources, an optical element 135 may be provided for each illumination light source. In a different embodiment in which the barcode reader 100 has two illumination light sources, the optical elements 135 may be integral with one another, such as a single prism extending in width to each of the illumination light sources.

Figure 4:
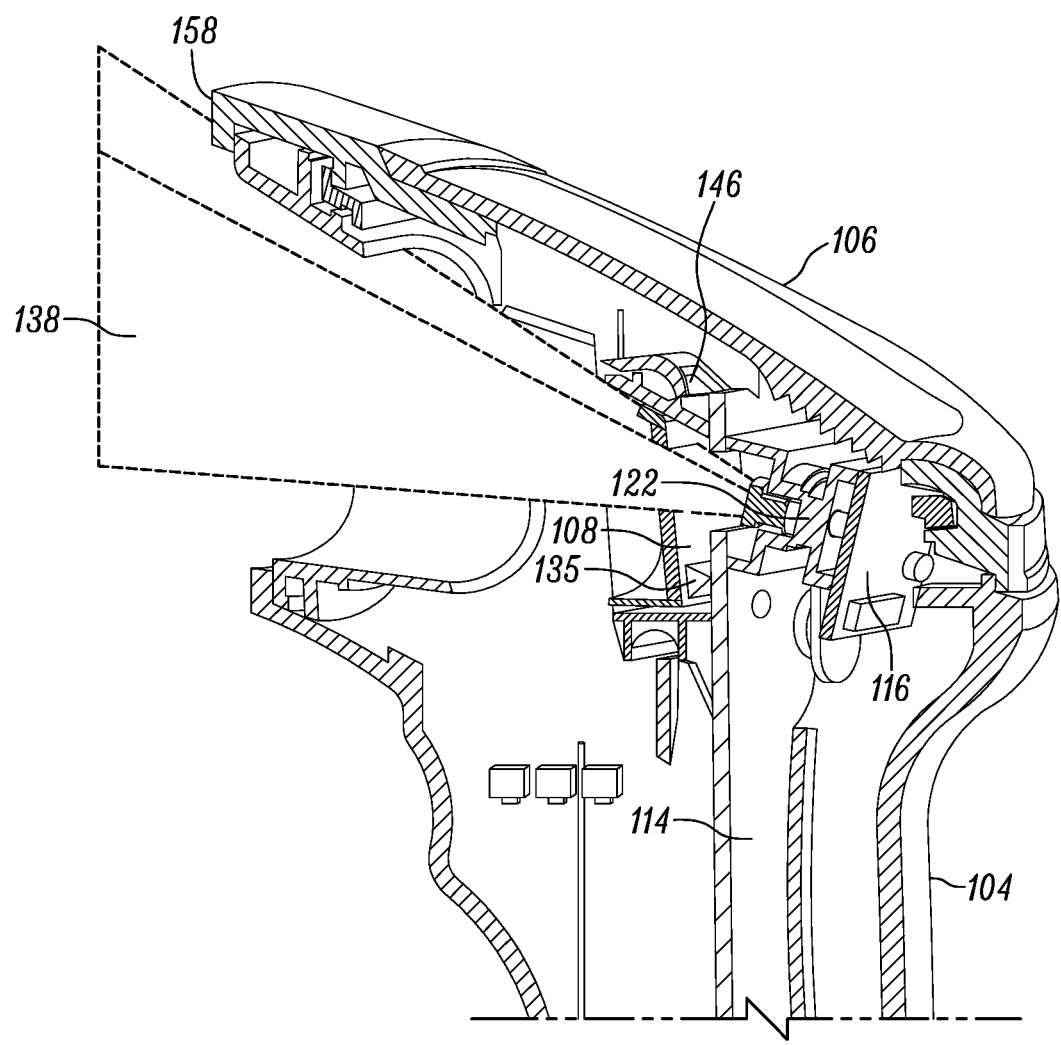
FIG. 4 illustrates a partial rear perspective cut-away view of the barcode reader of FIG. 3.

Referring now to FIGS. 3-4, shown therein is a barcode reader 100 with an exemplary component arrangement. In this arrangement, the reader 100 includes a handle portion 104 that extends in a generally upright direction and a head portion 106 positioned on a top of the handle portion 104. The handle portion 104 and the head portion 106 are generally hollow, allowing for electronic components to be installed therein. The head portion 106 has a proximal end 141, which may be defined as a plane at the nose 158, and a distal end 143, which may be defined as a plane at the back of the head portion 106. Conceptually, a central head axis 145 extends from the proximal end 141 to the distal end 143 of the head portion 106, and a central handle axis 151 extends from a superior end 147 to an inferior end 149 of the handle 104. The central FOV axis 136 is thus parallel and collinear with the central head axis 145 due to the surface of the circuit board 116 being normal to the central FOV axis 136. Although shown as being collinear with the central head axis 145, the central FOV axis 136 need not be collinear, though is generally parallel with the central head axis 145. In turn, the circuit board 114 is non-normal to the central FOV axis 136, such that the central illumination axis 137 diverges away from the central FOV axis 136 at the point of the illumination source 130.

In an embodiment, installation can be facilitated by inserting the electronic components downward into the handle portion 104 and thereafter securing the head portion 106 to the top of the handle portion 104. The electronic components can be secured within the handle and/or head portions via any number of suitable means, including, but not limited to, slide rails, fasteners, stakes, latches, screws, and so on. To reduce and/or eliminate contaminants, and/or protect the equipment inside the reader 100, an exit window 108 is provided in the head portion.

Internally, the electronic components include a first circuit board 114 with a decoder, where the circuit board 114 extends at least partially through the handle portion 104. In the current embodiment, circuit board 114 is a rigid printed circuit board that has a flat shape that can be said to define a first circuit board plane or substrate. The electronic components further include a second circuit board 116. In the current embodiment, the second circuit board 116 is positioned behind the first plane of the first circuit board 114 relative to the window 108. The second circuit board 116 includes an imaging assembly 118 that has an imaging sensor 120 and an imaging lens 122. The assembly is configured such that the imaging sensor 120 is operable to capture image data over the FOV 138, where that FOV 138 extends through the first plane of the first circuit board 114 and the window 108.

Since, in the shown embodiment, the two circuit boards 114 and 116 are not co-planar, the first circuit board 114 can be designed to extend into the head portion 106 (as shown) such that the FOV 138 passes through a fully enclosed cutout 144, also referred to as an aperture, in the first circuit board 114. Though the cutout 144 may be partially enclosed, a configuration with a fully enclosed cutout may be advantageous from a structural point of view as the top portion of the first circuit board 114 may be used to attach various components thereto.

In addition, in the shown embodiment, the planes of the two circuit boards 114 and 116 are not parallel. In particular, the planes are offset from one another by between 10 and 20 degrees, and preferably 15 degrees, thereby causing the central illumination axis to diverge from the central FOV axis 136 by the same angle. As such, the window 108 can be designed with an optical element 135 to redirect the central axis towards the central FOV axis 136, and, more particularly, towards a central transverse plane of the FOV 138.

Figure 5A:
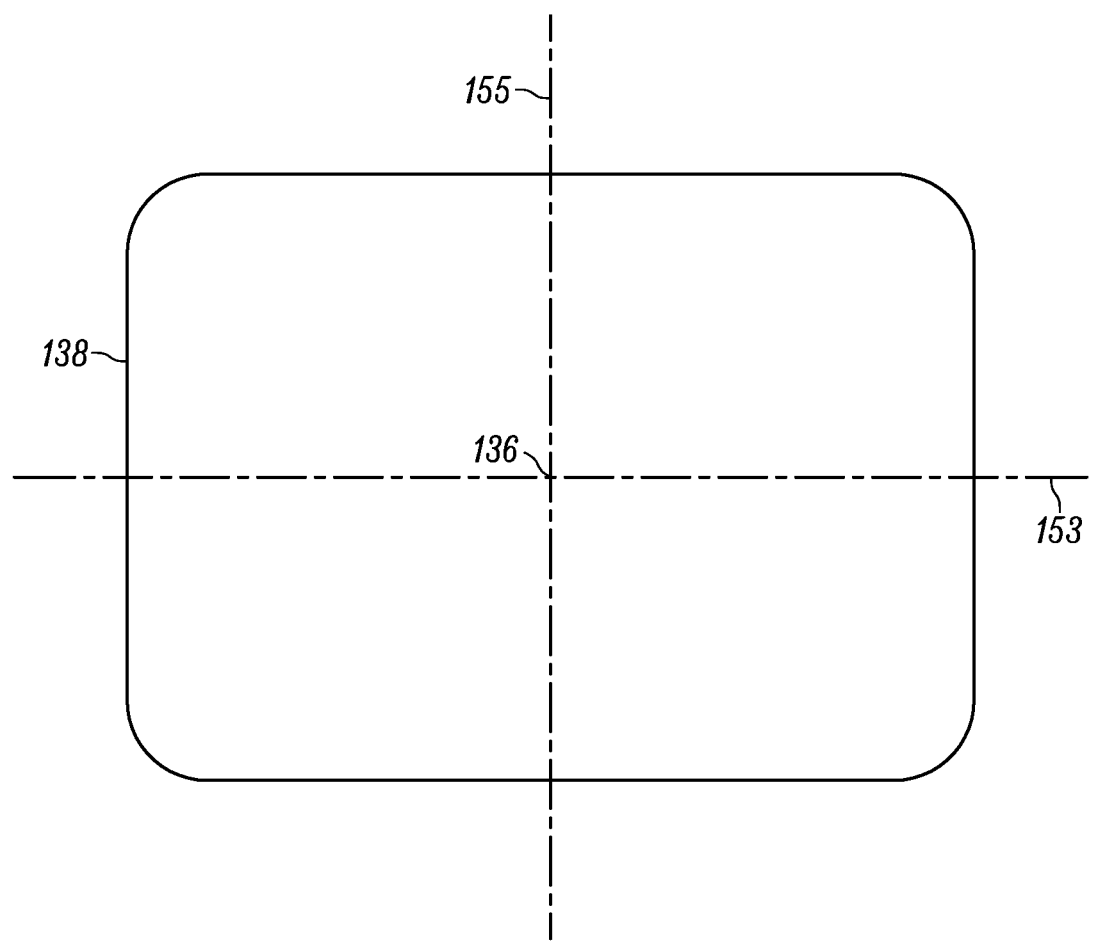
FIG. 5A illustrates a cross-sectional frontal view of the field of view of an imaging assembly of the barcode reader of FIG. 3.
Figure 5B:
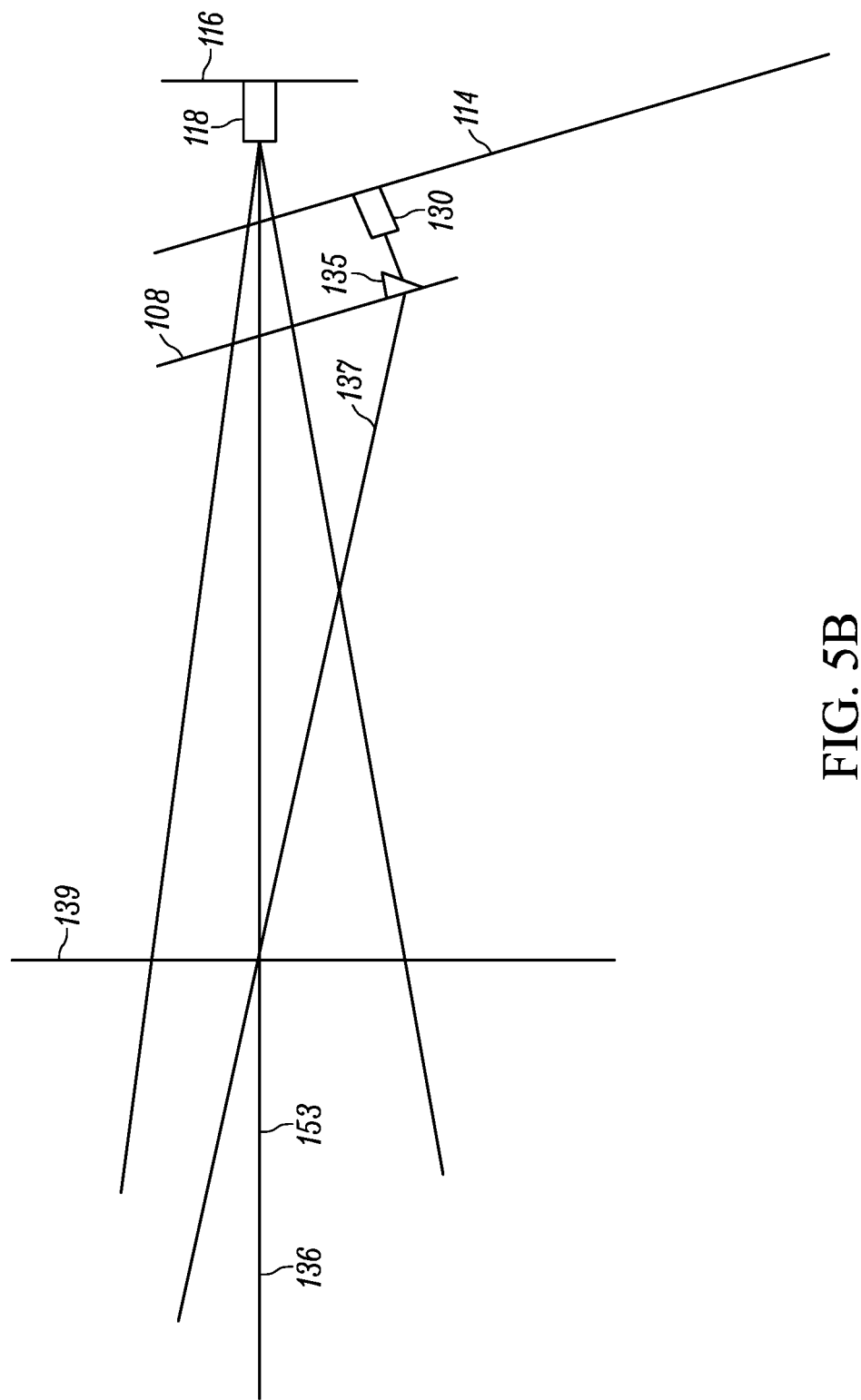
FIG. 5B illustrates a cross-sectional side view of the field of view of an imaging assembly of the barcode reader of FIG. 3.

Referring to FIGS. 5A and 5B which respectively illustrate a cross-sectional frontal view and a cross-sectional side view of the FOV 138 of an imaging assembly 118 having a two-dimensional imaging sensor 120. Being a two-dimensional imaging sensor 120, the FOV 138 of the imaging assembly 118 has both a horizontal or transverse FOV component 153, and a vertical or sagittal FOV component 155, such that the central FOV axis 136 extends along both a central transverse plane 153 and a central sagittal plane 155. With the central illumination axis 137 being non-parallel to the central FOV axis 136 at the point of the illumination light source 130, the optical component 135 redirects the central illumination axis 137 towards the transverse plane 153, such that the central illumination axis 137 intersects the transverse plane 153, preferably within the working distance range of the barcode reader 100. In an embodiment, a surface 139 having a barcode is placed between 2 centimeters and 70 centimeters from the nose 158 of the head portion 106, and preferably at approximately half the distance between the NWD and FWD.

Figure 6:
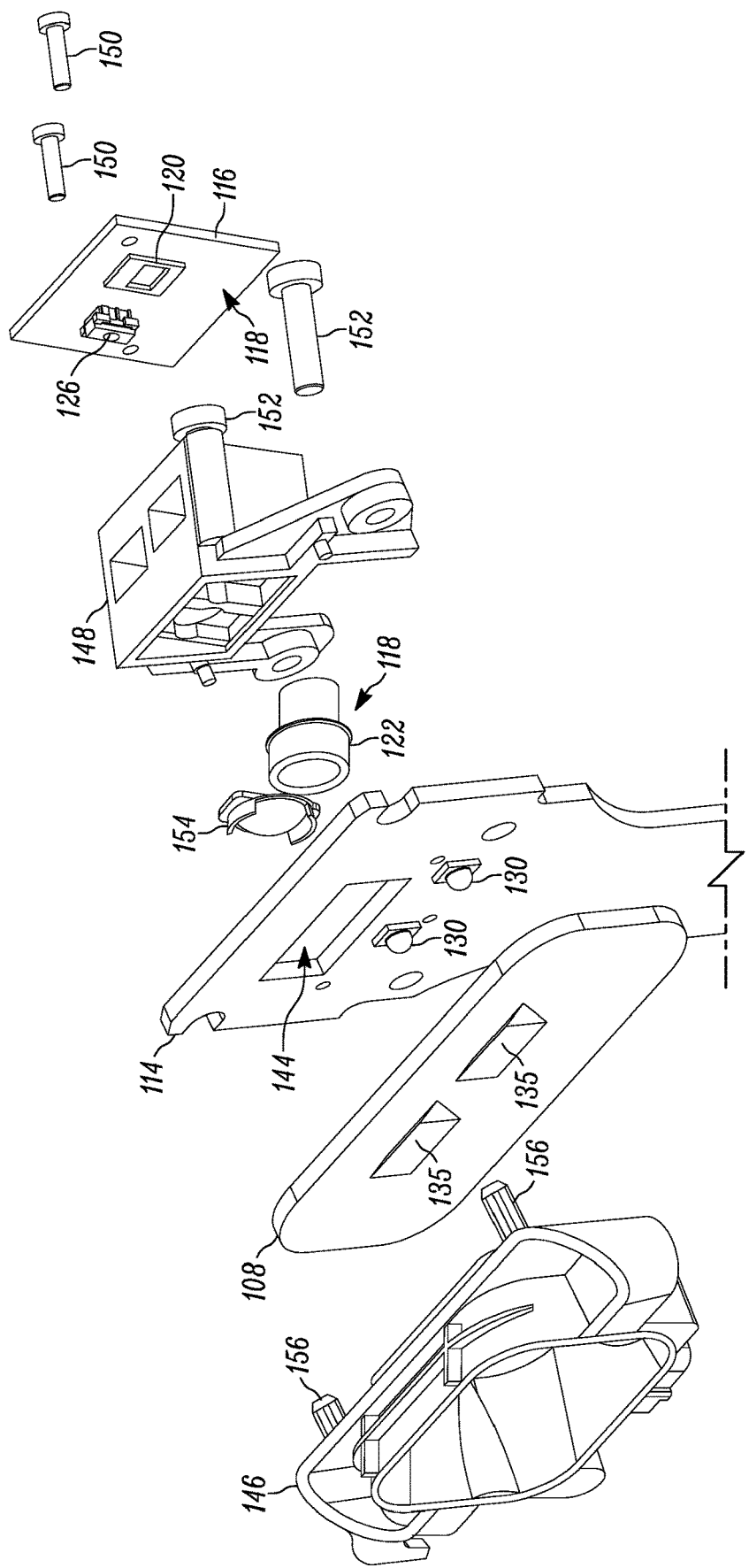
FIG. 6 illustrates an exploded perspective view of some of the components of the barcode reader of FIG. 3.
Figure 7:
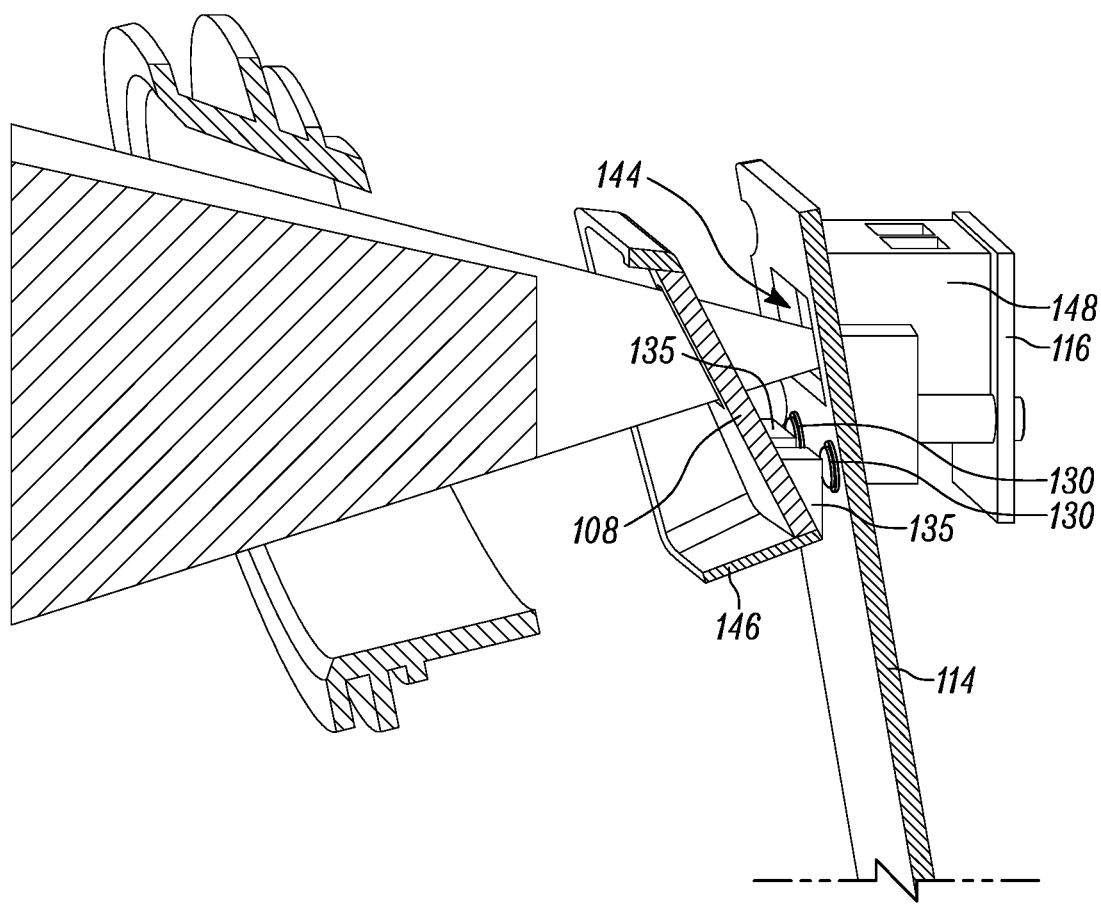
FIG. 7 illustrates a cross-sectional side view of some of the components of the barcode reader of FIG. 3.

Referring to FIGS. 6 and 7 which respectively illustrate an exploded side view and cross-sectional side view of some of the components of the reader 100, the top of the first circuit board 114 can be used as a mounting point for the second circuit board 116 and a window bezel 146 that houses the window 108. The second circuit board 116 is fixedly attached to the first circuit board 114 via a chassis member 148 that can act as a spacer and/or an alignment member. In particular, the second circuit board 116 is attached to the back of the chassis member 148 using staking member 150. In turn, the chassis member 148 is attached to the first circuit board 114 via staking members 152. Staking members 150 and 152 may be press fitted into their respective receiving apertures. Alternatively, other securing methods may be used that include, but are not limited to, using latches, screws, adhesives, alignment pockets, and so on. Included in the chassis member 148 is an imaging lens 122 for providing the desired FOV 138. Additionally, an aiming lens 154 is also installed in the chassis member 148, in front of an aiming light source 126 positioned on the second circuit board 116. On the opposite of the first circuit board 114, the window bezel 146 is fixedly attached thereto using alignment pins 156 configured to fit into respective alignment holes on the circuit board 114. A window 108 is fixedly positioned within the window bezel 146 by adhesion or press fitting. One or more optical elements 135 may be fixedly attached to the window 108 using an adhesive and/or integral as part of molding the window 108. The optical element(s) 135 are positioned on the window 108 so as to be aligned with a corresponding illumination light source(s) 130. In a preferred embodiment, the window 108 is positioned between the rear end of the window bezel 146 and the front surface of the first circuit board 114.

Using the presently described configuration allows the imaging sensor to be positioned relatively far back in the head portion relative to the window 108 or to the front of the head portion, which may be defined as a plane that is normal to the central FOV axis 136, and that intersects the FOV 138 at the most frontal section 158 of the head portion 106. Additionally, this can be achieved via direct sight without the use of mirrors. In some embodiments, the direct distance between the imaging sensor 120 and the window 108 is between 25 and 35 mm. In this case, the width of the FOV 138 at the window is between 20 and 25 mm. Also, in some embodiments, the direct distance between the imaging sensor 120 and a front of the head portion 106 is between 65 and 75 mm. In this case, the width of the FOV at the front of the head portion is between 45 and 50 mm. The aforementioned distances may be measured along the central FOV axis 136.

Finally, the first circuit board 114 and the second circuit board 116 are connected via a communication cable (e.g., cable, flexible PCB, etc.) to enable necessary communication between the electronic components on both circuit boards.

In operation in accordance with some embodiments, the controller 132 sends a command signal to energize the illumination source 130 for a predetermined illumination time period. The controller 132 then causes the imaging sensor 120 to activate in an effort to capture an image of a barcode. The captured image(s) are transferred to the controller 132 as pixel data. Such pixel data is digitally processed by the decoder (either in or outside the controller 132) to decode the barcode, if one is present within the FOV 138. The information obtained from decoding the barcode is then stored in the memory 134 and/or sent to other devices for further processing via communication means that are used to connect the reader 100 to the other devices.

The presently described configuration further allows for redirection of the central illumination axis 137, particularly when the central illumination axis 137 is originally non-parallel with the central FOV axis 136, thereby resulting in uniformly illuminating the barcode while keeping the barcode within the FOV of the imaging assembly 118. In addition, the lack of magnification (or minimal magnification) by the optical element 135 avoids projecting hotspots on the barcode, which improves image quality.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An assembly comprising:
    a housing having a scanning head and a handle, the scanning head having a proximal end and a distal end, and a central head axis extending from the proximal end to the distal end, the scanning head further having a top portion and a bottom portion, the bottom portion being opposite the top portion, the handle being attached to the scanning head at the bottom portion;

an imaging assembly positioned within the scanning head, wherein the imaging assembly has a field of view (FOV) directed towards the proximal end, the FOV having a central FOV axis parallel in relation to the central head axis, the imaging assembly configured to capture at least one of: light reflected from a target and light emitted from a target;

an illumination assembly positioned within the scanning head in front of the imaging assembly and facing the bottom portion and the proximal end at an acute angle with respect to the central head axis, wherein the illumination assembly is configured to emit light having a central illumination axis, such that the central illumination axis at the point of the illumination assembly is non-parallel to the central FOV axis and is directed towards the bottom portion and the proximal end; and a prism positioned within the scanning head in front of the illumination assembly, and configured to redirect the central illumination axis such that the central illumination axis converges towards the central FOV axis as both axes extend away from the proximal end.

2. The apparatus of claim 1, wherein the acute angle with respect to the central head axis is within the range of ten degrees and twenty degrees.

3. The apparatus of claim 1, further comprising a window at the proximal end of the scanning head, wherein the FOV extends through the window, and wherein the prism is integral with the window.

4. The apparatus of claim 1, further comprising a window at the proximal end of the scanning head, wherein the FOV extends through the window, and wherein the prism is affixed to a surface of the window facing the illumination assembly.

5. The apparatus of claim 1, wherein the illumination assembly is mounted on a surface of a substrate, the surface of the substrate facing the proximal end in a direction at the acute angle with respect to the central head axis.

6. The apparatus of claim 5, wherein the substrate comprises an enclosed aperture, and the imaging assembly is mounted behind the substrate, wherein the FOV extends through the enclosed aperture.

7. The apparatus of claim 5, wherein the substrate is a printed circuit board that extends partially within the scanning head and partially within the handle.

8. The apparatus of claim 7, wherein the surface of the substrate is a first side of the printed circuit board, and wherein the printed circuit board is arranged relative to the handle such that the first side of the printed circuit board defines a plane that is perpendicular to a central handle axis.

9. The apparatus of claim 3, wherein the FOV extends through an upper portion of the window and wherein the prism is integral with a lower portion of the window, the upper portion of the window being closer to the top portion of the scanning head than the lower portion, the lower portion being closer to the bottom portion than the upper portion.

10. The apparatus of claim 1, wherein the illumination assembly and the prism are configured to provide non-diffused illumination beyond a nose of the of the scanning head.

* * * * *